United States Patent
Kim

(10) Patent No.: US 7,150,469 B2
(45) Date of Patent: Dec. 19, 2006

(54) METHOD FOR CONTROLLING GAS PRESSURE OF A PASSENGER-SIDE AIRBAG

(75) Inventor: Yong Jun Kim, Hwaseong (KR)

(73) Assignee: Hyundai Motor Company, Seoul (KR)

(*) Notice: Subject to any disclaimer, the term of this patent is extended or adjusted under 35 U.S.C. 154(b) by 374 days.

(21) Appl. No.: 10/747,892

(22) Filed: Dec. 29, 2003

(65) Prior Publication Data
US 2005/0029783 A1 Feb. 10, 2005

(30) Foreign Application Priority Data
Aug. 8, 2003 (KR) .............. 10-2003-0054915

(51) Int. Cl.
B60R 21/16 (2006.01)
(52) U.S. Cl. .................. 280/735; 701/45
(58) Field of Classification Search ........ 280/735, 280/734; 701/45; 307/10.1; 340/436, 438
See application file for complete search history.

(56) References Cited

U.S. PATENT DOCUMENTS

| | | | | |
|---|---|---|---|---|
| 5,490,069 A * | 2/1996 | Gioutsos et al. | .............. | 701/45 |
| 5,890,085 A * | 3/1999 | Corrado et al. | .............. | 701/47 |
| 5,957,490 A * | 9/1999 | Sinnhuber | .............. | 280/735 |
| 5,983,147 A * | 11/1999 | Krumm | .............. | 701/45 |
| 6,029,997 A * | 2/2000 | Kwon | .............. | 280/743.1 |
| 6,302,438 B1 * | 10/2001 | Stopper et al. | .............. | 280/735 |
| 6,378,900 B1 * | 4/2002 | Stanley et al. | .............. | 280/735 |
| 6,459,974 B1 * | 10/2002 | Baloch et al. | .............. | 701/45 |
| 6,520,535 B1 * | 2/2003 | Stanley et al. | .............. | 280/735 |
| 6,711,399 B1 * | 3/2004 | Granier | .............. | 455/404.1 |
| 6,921,108 B1 * | 7/2005 | Kojima et al. | .............. | 280/735 |
| 6,940,026 B1 * | 9/2005 | Rundell et al. | .............. | 177/144 |
| 2002/0059022 A1 * | 5/2002 | Breed et al. | .............. | 701/45 |
| 2002/0079679 A1 * | 6/2002 | Thiele et al. | .............. | 280/735 |
| 2002/0082756 A1 * | 6/2002 | Breed et al. | .............. | 701/45 |
| 2005/0006886 A1 * | 1/2005 | Foo et al. | .............. | 280/735 |
| 2005/0187686 A1 * | 8/2005 | Wanami et al. | .............. | 701/45 |
| 2005/0200479 A1 * | 9/2005 | James | .............. | 340/539.18 |
| 2005/0248136 A1 * | 11/2005 | Breed et al. | .............. | 280/735 |

FOREIGN PATENT DOCUMENTS

| | | |
|---|---|---|
| JP | 05-072601 | 3/1993 |
| JP | 06-072276 | 3/1994 |
| JP | 10-119713 | 5/1998 |
| JP | 2002-19555 | 1/2002 |
| JP | 2002-544495 | 12/2002 |
| JP | 2004-502591 | 1/2004 |

* cited by examiner

Primary Examiner—David R. Dunn
Assistant Examiner—Drew J. Brown
(74) Attorney, Agent, or Firm—Morgan Lewis & Bockius LLP

(57) ABSTRACT

A method for controlling gas pressure for inflating a passenger-side frontal airbag in a vehicle comprises a determination of the type and number of passengers in the passenger seat and a determination of the nature and severity of the impact. When at least one passenger is resident in the passenger seat, the current passenger type is selected from a plurality of predetermined passenger types. The gas pressure for inflating the passenger-side frontal airbag is adjusted on the basis of the current passenger type and number, and the frontal impact generated from the collision.

3 Claims, 3 Drawing Sheets

METHOD FOR CONTROLLING GAS PRESSURE OF A PASSENGER-SIDE AIRBAG

CROSS-REFERENCE TO RELATED APPLICATIONS

This application claims priority of Korean Application No. 10-2003-0054915, filed on Aug. 8, 2003, the disclosure of which is incorporated fully herein by reference.

FIELD OF THE INVENTION

The present invention relates to a passenger-side airbag, and more particularly to a method for controlling gas pressure of the passenger-side airbag.

BACKGROUND OF THE INVENTION

Recently, a passenger-side airbag as well as a driver-side airbag has been provided in a vehicle. Generally, when a vehicle that is provided with a passenger-side airbag including a passenger-side frontal airbag and a passenger-side side airbag is occupied by only a driver without a passenger, in the case of a frontal collision, the passenger-side airbag is not required to be inflated. Accordingly, it is preferable that the passenger-side airbag is only inflated under a condition in which the passenger is resident in the passenger seat.

In order to detect whether the passenger is resident in the passenger seat, a pressure sensor, for example a piezoelectric element, is disposed under the passenger seat such that whether the passenger-side airbag is required to be inflated is determined based on the signal from the pressure sensor.

However, in the non-recommended case that at least two passengers are resident in the passenger seat together, the at least two passengers could be damaged by the inflated airbag. This is especially true for a frontal passenger-side airbag, because the presence of more than one passenger can not be detected.

SUMMARY OF THE INVENTION

An exemplary method for controlling gas pressure for inflating a passenger-side frontal airbag according to an embodiment of the present invention comprises determining whether at least one passenger is resident in the passenger seat, determining the number of passengers and a current passenger type when at least one passenger is resident in the passenger seat, the current passenger type being selected from a plurality of predetermined passenger types, determining whether the number of passengers is not one, determining, in the case that the number of passengers is not one, whether a collision occurs, determining, in the case of a vehicle collision, whether the vehicle collision is a frontal collision, detecting, in the case of a frontal collision, a frontal impact generated from the vehicle collision, and adjusting the gas pressure for inflating the passenger-side frontal airbag on the basis of the current passenger type and the frontal impact generated from the collision.

Preferably, when the current passenger type is a child only type, the adjusting the gas pressure comprises determining whether the detected frontal impact is larger than a first predetermined impact ($Im\_1$) and determining whether the detected frontal impact is larger than a second predetermined impact ($Im\_2$ wherein, $Im\_2 > Im\_1$). When the detected frontal impact is not larger than the first predetermined impact, the passenger-side airbag is not operated. When the detected impact is larger than the first predetermined impact ($Im\_1$) and is not larger than the second predetermined impact ($Im\_2$), the gas pressure is formed to be 25% of a normal pressure ($P\_normal$). When the detected impact is larger than the second predetermined impact ($Im\_2$) the gas pressure is formed to be 50% of the normal pressure ($P\_normal$).

Preferably, when the current passenger type is an adult only type, the adjusting the gas pressure comprises determining whether the detected frontal impact is larger than a first predetermined impact ($Im\_1$) and determining whether the detected frontal impact is larger than a second predetermined impact ($Im\_2$ wherein, $Im\_2 > Im\_1$). When the detected frontal impact is not larger than the first predetermined impact, the passenger-side airbag is not operated. When the detected impact is larger than the first predetermined impact ($Im\_1$) and is not larger than the second predetermined impact ($Im\_2$), the gas pressure is formed to be 75% of a normal pressure ($P\_normal$). When the detected impact is larger than the second predetermined impact ($Im\_2$), the gas pressure is formed to be 100% of the normal pressure ($P\_normal$).

Preferably, when the current passenger type is an child-adult mixed type, the adjusting the gas pressure comprises determining whether the detected frontal impact is larger than a first predetermined impact ($Im\_1$) and determining whether the detected frontal impact is larger than a second predetermined impact ($Im\_2$ wherein, $Im\_2 > Im\_1$). When the detected frontal impact is not larger than the first predetermined impact the passenger-side airbag is not operated. When the detected impact is larger than the first predetermined impact ($Im\_1$) and is not larger than the second predetermined impact ($Im\_2$), the gas pressure is formed to be 25% or 50% of a normal pressure ($P\_normal$). When the detected impact is larger than the second predetermined impact ($Im\_2$) the gas pressure is formed to be 50% or 75% of the normal pressure ($P\_normal$).

Preferably, when there is more than one passenger resident in the passenger seat, the method further comprises transmitting an alarm with a predetermined means for alarming.

Embodiments of the present invention thus provide a method for controlling gas pressure for inflating a passenger-side airbag having non-limiting advantages of preventing the at least two passengers from being injured when at least two passenger are resident in the passenger seat.

DETAILED DESCRIPTION OF THE PREFERRED EMBODIMENTS

Figure 1:
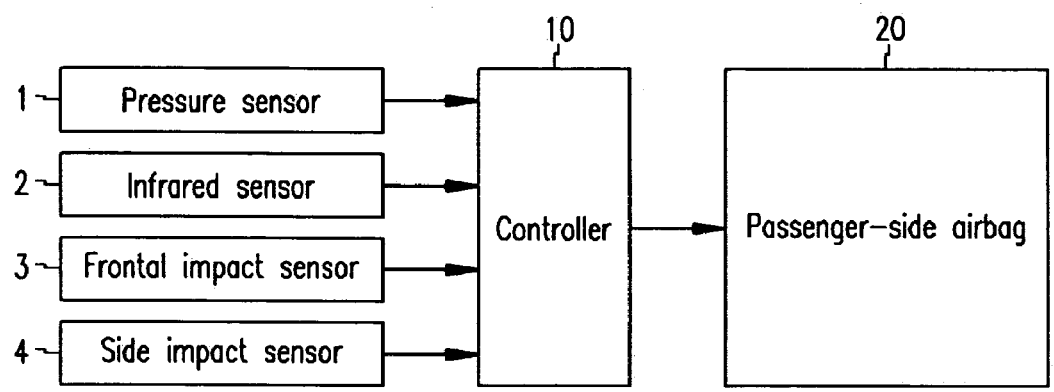
FIG. 1 is a block diagram showing a system for controlling gas pressure of a passenger-side airbag according to an embodiment of the present invention.

As shown in FIG. 1, a system for controlling gas pressure of a passenger-side airbag includes a passenger seat pressure sensor 1, an infrared sensor 2, a frontal collision impact sensor 3, a side collision impact sensor 4, and a controller 10. The pressure sensor 1, which is mounted under the passenger seat, may be a piezoelectric element and outputs a signal regarding whether at least one passenger is resident in the passenger seat. The infrared sensor 2 detects a change of surface charges caused by a temperature change during absorption of infrared energy emitted from the projected object. Specifically, although a passenger in the vehicle only moves minutely, the infrared energy changes such that the number of passengers in the passenger seat and a passenger type can be detected.

For example, the number of passengers can be determined from the outline of the projected object, and the passenger type can be determined from the area of the projected object.

The passenger types are divided into a plurality of predetermined types, such as an adult or a child. More particularly, in the case that two passengers are resident in the passenger seat, the passenger types include an adult only type, a child only type, and an adult-child mixed type.

When a frontal collision occurs, the frontal impact sensor 3 outputs a signal representative of the impact during the head-on collision. When a side collision occurs, the side impact sensor 4 outputs a signal representative of the impact during the side collision. The signals from the frontal impact sensor 3 and the side impact sensor 4 are inputted to the controller 10. The controller 10 determines whether the passenger-side airbag should be operated, and controls the gas pressure for inflating the passenger-side airbag on the basis of the signals from the pressure sensor 1, the infrared sensor 2, the frontal impact sensor 3, and the side impact sensor 4. Controller 10 may comprise a processor and associated hardware as may be selected and programmed by a person of ordinary skill in the art based on the teachings of the present invention.

Figure 2:
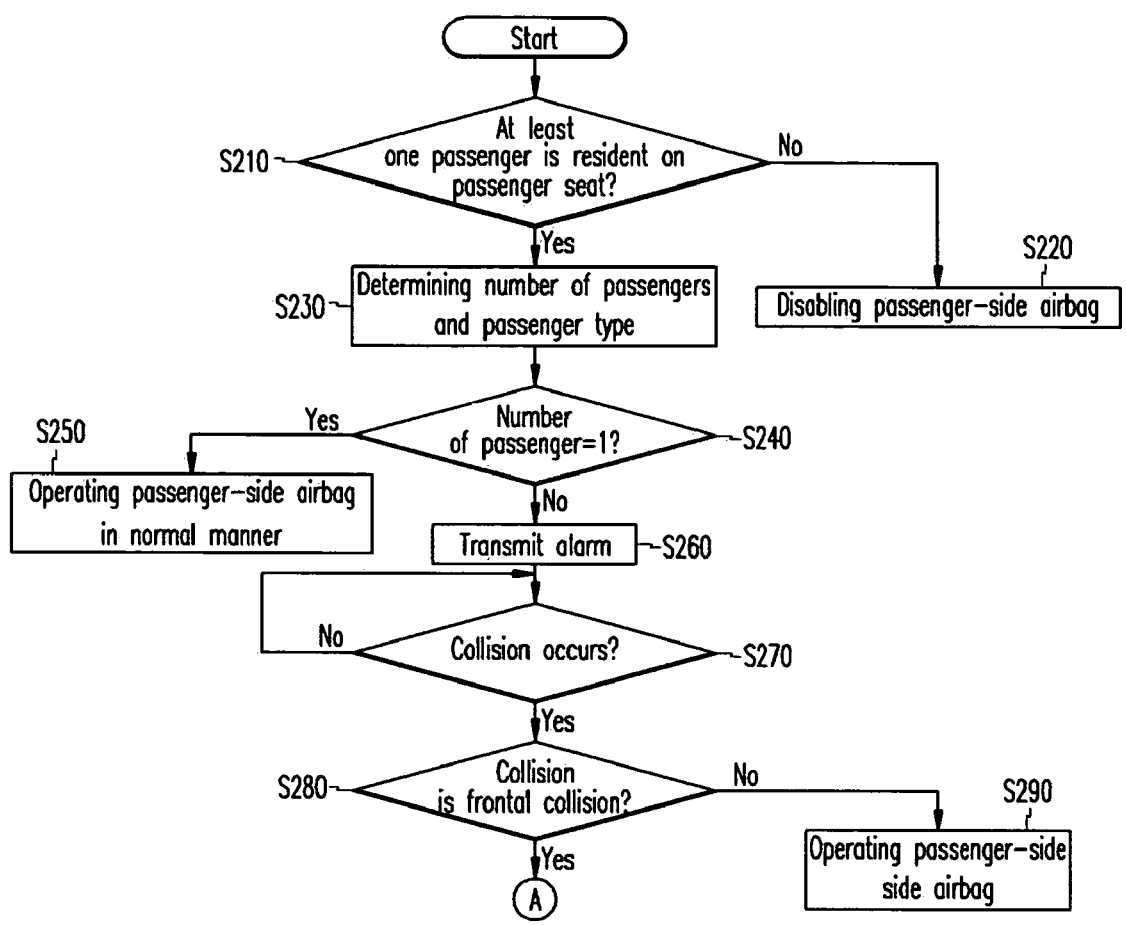
FIG. 2 is a flow diagram showing a method for controlling gas pressure of a passenger-side airbag according to an embodiment of the present invention.

As shown in FIG. 2, at step S210, the controller 10 determines whether at least one passenger is positioned in the passenger seat based on the signal from the pressure sensor 1 mounted in the passenger seat. The controller 10, when at least one passenger is not positioned in the passenger seat, controls the passenger-side air bag 30 to not be operated at step S220.

The controller 10, when at least one passenger is positioned in the passenger seat, determines the number of passengers and a passenger type at step S230.

Subsequently, the controller 10 determines whether the number of passengers is more than one at step S240. When the number of passengers is one, the passenger-side air bag is controlled in a predetermined normal manner at step S250.

When the number of passengers is more than one, an alarm for informing that a current passenger type is a non-recommended passenger type is transmitted by a predetermined means for alarming such as a speaker or a display means on an instrument panel of the vehicle, at step S260. Subsequently, the controller 10, when the collision occurs, controls the gas pressure for inflating the passenger-side air bag on the basis of the passenger type and the impact caused from the collision.

At step S270, the controller 10 determines whether a collision occurs on the basis of the signal from the frontal impact sensor 3 and the side impact sensor 4, and when the collision occurs, it determines whether the collision is a frontal collision at step S280.

When the collision is not a frontal collision, the passenger-side side airbag is operated in a predetermined manner at step S290.

Figure 3:
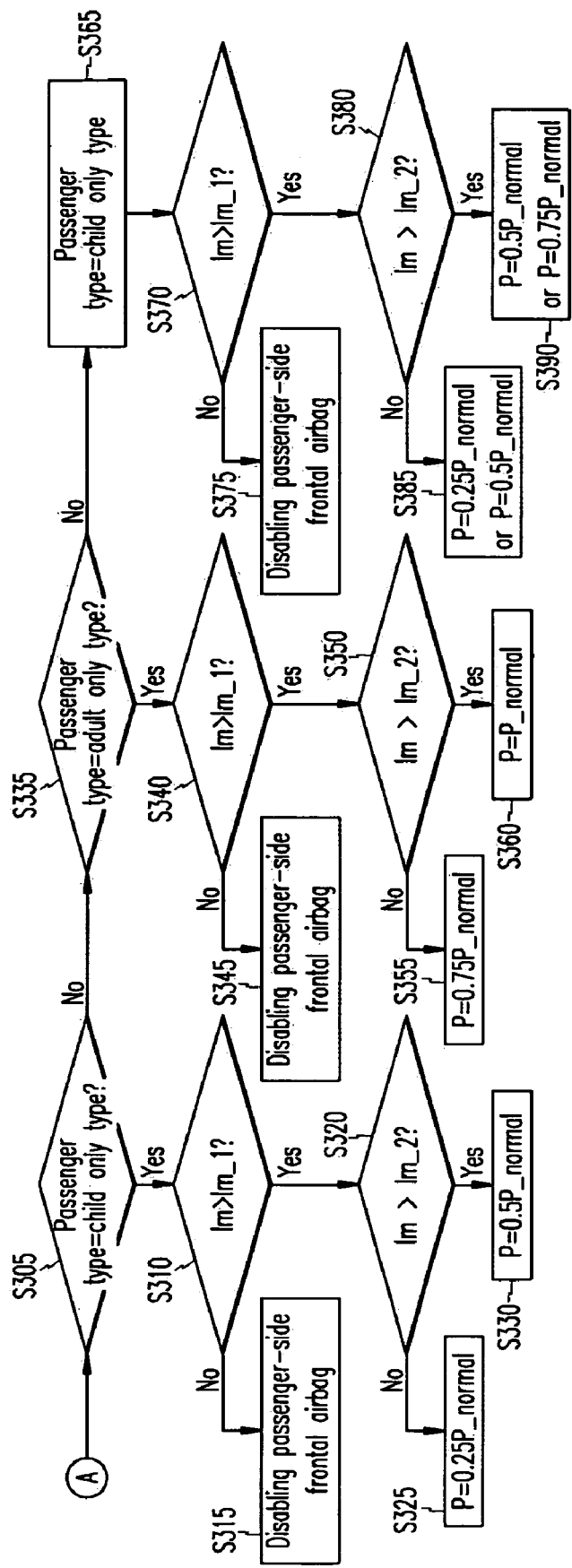
FIG. 3 is a flow diagram showing a method for controlling gas pressure of a passenger-side airbag according to an embodiment of the present invention.

Meanwhile, when the collision is a frontal collision, the passenger-side frontal airbag is controlled on the basis of the passenger type and the frontal impact according to the flow diagram shown in FIG. 3.

When the collision is determined to be a frontal collision at step S290, the controller 10 determines whether the passenger type is a child only type at step S305.

When the passenger type is the child only type, the controller 10 determines whether the detected frontal impact is larger than a first predetermined impact (Im_1) at step S310.

When the detected frontal impact is not larger than the first predetermined impact (Im_1), the passenger-side airbag is controlled to not operate at step S315.

When the detected frontal impact is larger than the first predetermined impact (Im_1), the controller 10 determines whether the detected frontal impact is larger that a second predetermined frontal impact (Im_2, wherein Im_2>Im_1) at step S320.

When the detected frontal impact is larger than the first predetermined impact (Im_1) and is not larger than the second predetermined impact (Im_2), the gas pressure for inflating the passenger-side frontal airbag is formed to be 25% of a predetermined gas pressure (P_normal), which is a gas pressure in normal usage of the passenger-side frontal airbag at step S325.

When the detected frontal impact is larger than the second predetermined impact (Im_2), the gas pressure is formed to be 50% of the predetermined gas pressure at step S330.

Meanwhile, when the passenger type is not a child only type at step S305, the controller determines the passenger type is an adult only type at step S335.

When the passenger type is the adult only type, the controller 10 determines whether the detected frontal impact is larger than the first predetermined impact (Im_1) at step S340.

When the detected frontal impact is not larger than the first predetermined impact (Im_1), the passenger-side airbag is controlled to not operate at step S345.

When the detected frontal impact is larger than the first predetermined impact (Im_1), the controller 10 determines whether the detected frontal impact is larger that the second predetermined frontal impact (Im_2, wherein Im_2>Im_1) at step S350.

When the detected frontal impact is larger than the first predetermined impact (Im_1) and is not larger than the second predetermined impact (Im_2), the gas pressure for inflating the passenger-side frontal airbag is formed to be 75% of the predetermined gas pressure (P_normal) at step S355.

When the detected frontal impact is larger than the second predetermined impact (Im_2), the gas pressure is formed to be 100% of the predetermined gas pressure at step S360.

Furthermore, when the passenger type is not only a child only type but also an adult only type, the controller 10 determines the passenger type is a child-adult mixed type at step S365.

When the passenger type is the child-adult mixed type, the controller 10 determines whether the detected frontal impact is larger than the first predetermined impact (Im_1) at step S370.

When the detected frontal impact is not larger than the first predetermined impact (Im_1), the passenger-side airbag is controlled to not operate at step S375.

When the detected frontal impact is larger than the first predetermined impact (Im_1), the controller 10 determines whether the detected frontal impact is larger that the second predetermined frontal impact (Im_2, wherein Im_2>Im_1) at step S380.

When the detected frontal impact is larger than the first predetermined impact (Im_1) and is not larger than the second predetermined impact (Im_2), the gas pressure for inflating the passenger side frontal airbag is formed to be 25% or 50% of the predetermined gas pressure (P_normal) at step S385.

When the detected frontal impact is larger than the second predetermined impact (Im_2), the gas pressure is formed to be 50% or 75% of the predetermined gas pressure at step S360.

According to a method for controlling gas pressure for inflating a passenger-side airbag in a vehicle, the gas pressure is adjusted in accordance with a number of passengers resident in the passenger seat, and for a passenger type in the case of at least two passengers such that the at least two passengers are prevented from being injured by the gas pressure for inflating a passenger-side frontal airbag.

What is claimed is:

1. A method for controlling gas pressure for inflating a passenger-side frontal airbag in a vehicle, comprising:
    determining whether at least one passenger is resident in the passenger seat;
    determining a number of passengers and a current passenger type corresponding to the at least one passenger when at least one passenger is resident in the passenger seat, the current passenger type being selected from a plurality of predetermined passenger types;
    determining whether the number of the at least one passenger is not one;
    determining, in the case that the number of the at least one passenger is not one, whether a collision occurs;
    determining, in the case of a vehicle collision, whether the vehicle collision is a frontal collision;
    detecting, in the case of the frontal collision, a frontal impact generated from the vehicle collision; and
    adjusting the gas pressure for inflating the passenger-side frontal airbag on the basis of the current passenger type and the frontal impact generated from the collision;
    wherein when the current passenger type is a child only type, the adjusting the gas pressure comprises:
        determining whether the detected frontal impact is larger than a first predetermined impact (Im_1); and
        determining whether the detected frontal impact is larger than a second predetermined impact (Im_2 wherein Im_2>Im_1),
        wherein when the detected frontal impact is not larger than the first predetermined impact the passenger-side airbag is not operated,
        wherein when the detected impact is larger than the first predetermined impact (Im_1) and is not larger than the second predetermined impact (Im_2) the gas pressure is formed to be 25% of a normal pressure (P_normal), and
        wherein when the detected impact is larger than the second predetermined impact (Im_2) the gas pressure is formed to be 50% of the normal pressure (P_normal).

2. A method for controlling gas pressure for inflating a passenger-side frontal airbag in a vehicle, comprising:
    determining whether at least one passenger is resident in the passenger seat;
    determining a number of passengers and a current passenger type corresponding to the at least one passenger when at least one passenger is resident in the passenger seat, the current passenger type being selected from a plurality of predetermined passenger types;
    determining whether the number of the at least one passenger is not one;
    determining, in the case that the number of the at least one passenger is not one, whether a collision occurs;
    determining, in the case of a vehicle collision, whether the vehicle collision is a frontal collision;
    detecting, in the case of the frontal collision, a frontal impact generated from the vehicle collision; and
    adjusting the gas pressure for inflating the passenger-side frontal airbag on the basis of the current passenger type and the frontal impact generated from the collision;
    wherein when the current passenger type is an adult only type, the adjusting the gas pressure comprises:
        determining whether the detected frontal impact is larger than a first predetermined impact (Im_1); and
        determining whether the detected frontal impact is larger than a second predetermined impact (Im_2 wherein Im_2>Im_1),
        wherein when the detected frontal impact is not larger than the first predetermined impact the passenger-side airbag is not operated,
        wherein when the detected impact is larger than the first predetermined impact (Im_1) and is not larger than the second predetermined impact (Im_2) the gas pressure is formed to be 75% of a normal pressure (P_normal), and
        wherein when the detected impact is larger than the second predetermined impact (Im_2) the gas pressure is formed to be 100% of the normal pressure (P_normal).

3. A method for controlling gas pressure for inflating a passenger-side frontal airbag in a vehicle, comprising:
    determining whether at least one passenger is resident in the passenger seat;
    determining a number of passengers and a current passenger type corresponding to the at least one passenger when at least one passenger is resident in the passenger seat, the current passenger type being selected from a plurality of predetermined passenger types;
    determining whether the number of the at least one passenger is not one;
    determining, in the case that the number of the at least one passenger is not one, whether a collision occurs;
    determining, in the case of a vehicle collision, whether the vehicle collision is a frontal collision;
    detecting, in the case of the frontal collision, a frontal impact generated from the vehicle collision; and
    adjusting the gas pressure for inflating the passenger-side frontal airbag on the basis of the current passenger type and the frontal impact generated from the collision;
    wherein when the current passenger type is a child-adult mixed type, the adjusting the gas pressure comprises:
        determining whether the detected frontal impact is larger than a first predetermined impact (Im_1); and
        determining whether the detected frontal impact is larger than a second predetermined impact (Im_2 wherein, Im_2>Im_1),
        wherein when the detected frontal impact is not larger than the first predetermined impact the passenger-side airbag is not operated,
        wherein when the detected impact is larger than the first predetermined impact (Im_1) and is not larger than the second predetermined impact (Im_2) the gas pressure is formed to be 25% or 50% of a normal pressure (P_normal), and
        wherein when the detected impact is larger than the second predetermined impact (Im_2) the gas pressure is formed to be 50% or 75% of the normal pressure (P_normal).

* * * * *